Oct. 23, 1956

M. L. MENNESSON
FOOTRESTS FOR PEDAL CYCLES FITTED
WITH AN AUXILIARY ENGINE 2,768,005

Filed Nov. 30, 1953

INVENTOR:
MARCEL LOUIS MENNESSON
BY
Bailey, Stephens & Huettig
ATTORNEYS

Oct. 23, 1956    M. L. MENNESSON    2,768,005
FOOTRESTS FOR PEDAL CYCLES FITTED
WITH AN AUXILIARY ENGINE
Filed Nov. 30, 1953    2 Sheets-Sheet 2
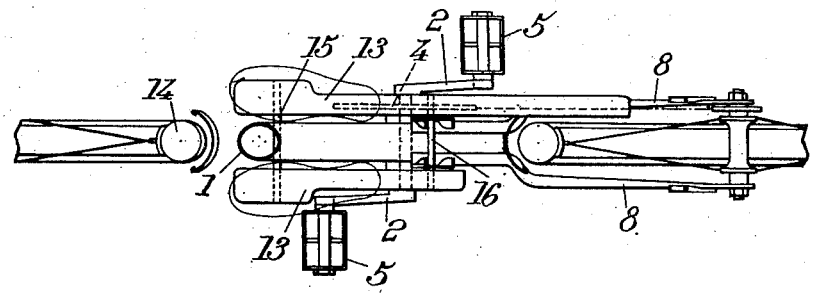
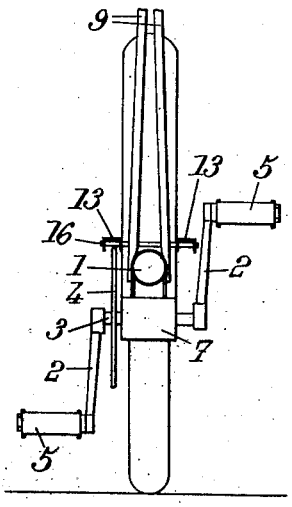
INVENTOR:
MARCEL LOUIS MENNESSON
BY
Bailey, Stephens & Huettig
ATTORNEYS

United States Patent Office 2,768,005
Patented Oct. 23, 1956

2,768,005

FOOTRESTS FOR PEDAL CYCLES FITTED WITH AN AUXILIARY ENGINE

Marcel Louis Mennesson, Neuilly-sur-Seine, France, assignor to Societe d'Appareils de Controle et d'Equipement des Moteurs S. A. C. E. M., Neuilly-sur-Seine, France Application November 30, 1953, Serial No. 395,167

Claims priority, application France December 10, 1952

1 Claim. (Cl. 280—291)

The present invention relates to pedal cycles and in particular pedal cycles fitted with an auxiliary engine, especially when this engine is carried by the front fork of the cycle.

The chief object of my invention is to provide a vehicle of this type which is better adapted to meet the requirements of practice than those existing at the present time.

The vehicles of this type with which my invention is concerned include two crank arms at 180° to each other and pivoted to the cycle frame at the lower part thereof, the pedals being pivoted to the ends of said crank arms respectively about axes parallel to the horizontal axis (at right angles to the plane of the cycle frame) about which said crank arms are pivoted to said frame, and the toothed disc or wheel on which the chain is engaged being rigid with said two crank arms coaxially with respect to said last mentioned axis.

According to my invention, I provide, between said crank arms and at a level higher than the top of said toothed disc, at least one support extending frontwardly to the vicinity of the cycle front wheel and shaped to enable the cyclist to rest his feet thereon.

A preferred embodiment of the present invention will be hereinafter described with reference to the accompanying drawings, given merely by way of example, and in which:

Fig. 2 is a plan view of this bicycle with parts shown in section;

Fig. 3 is a sectional view on the line III—III of Fig. 1.

Figure 1:
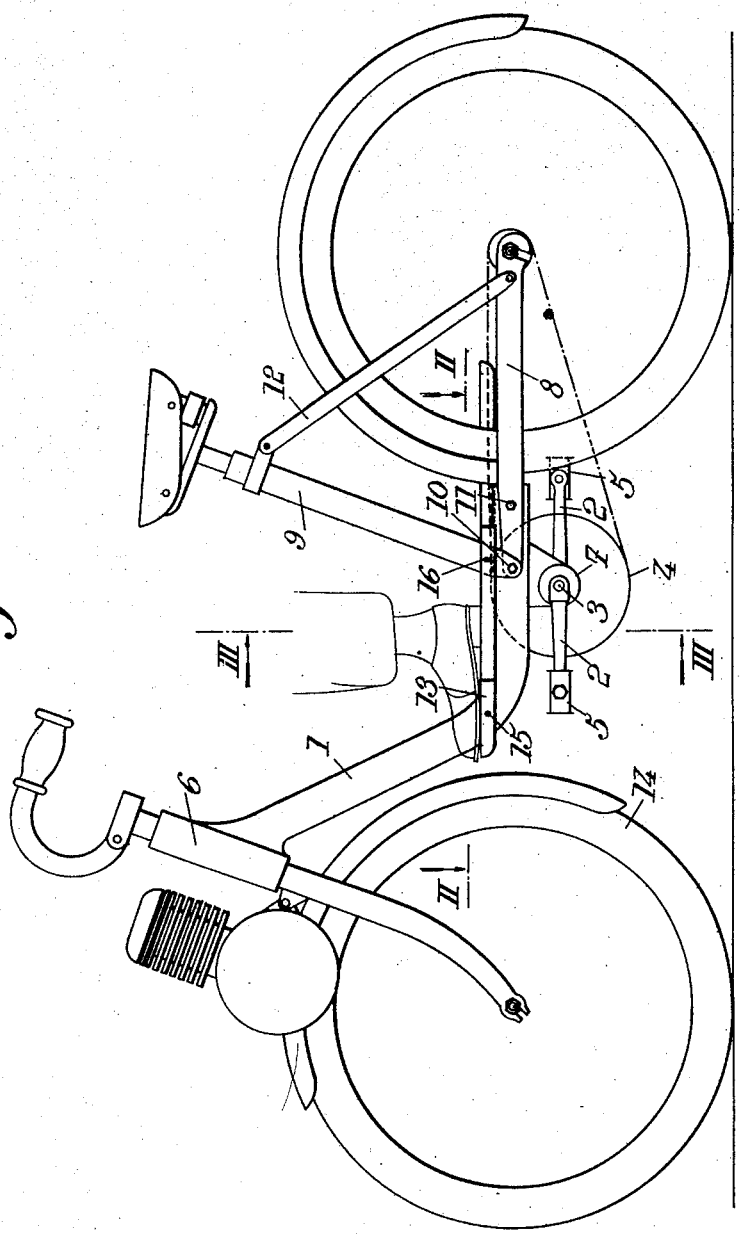
Fig. 1 is a side view of a bicycle according to my invention fitted with an auxiliary engine supported by the front fork.

The bicycle shown by the drawing includes a frame 1 to the lower part of which is pivoted a unit including two crank arms or levers 2 rigid with a spindle 3 on which is fixed the toothed disc 4 on which the chain is engaged, each of these crank arms 2 being provided at its end with a pedal 5 journalled thereon about a horizontal axis parallel to the pivot axis of spindle 3.

In the example illustrated by the drawing, the bicycle frame is constituted essentially by a main element including a single tube 1 carrying, at the front and top thereof, a sleeve 6 in which is pivoted the front wheel fork, and at the bottom thereof, a sleeve 7 in which spindle 3 is journalled. This tube 1 is curved to include a horizontal portion which extends above sleeve 7 and toward the rear. To this horizontal portion of tube 1 are secured, through bolts 10 and 11, two arms 8 forming the branches of the horizontal rear fork of the frame. To the same horizontal portion of tube 1 are also fixed, through bolt 10, two rods 9 for supporting the saddle. The upper ends of rods 9 and the rear ends of arms 8 are respectively connected together by rods 12 forming the branches of the oblique rear fork of the frame.

Now, according to my invention, I provide, between the frame (tube 1) and each of the crank arms 2, at a level above the top of toothed disc 4, a support 13 which extends frontwardly into the vicinity of the front wheel 14 of the bicycle, these supports 13 being so shaped that the cyclist can place his feet to rest upon them respectively.

Each of these supports or foot-rests 13 is constituted by a metal plate having downwardly bent edges so that it is of inverted U-shaped section. On the sides adjacent to the chain, these bent edges extend sufficiently far toward the rear, as shown by the drawing, to protect the cyclist's shoes and garments against contact with the chain. As shown by Fig. 3, the U-shaped cross section of support 13 enables it to surround the chain and to protect it not only from the top but also from the sides.

The foot-rests can easily be fixed at the front and at the rear by means of transverse pins 15 and 16, the front pin 15 passing for instance through tube 1 whereas the rear pin 16 passes through rods 9. Of course, both of said foot-rests must be relatively narrow where they are adjacent to the circles swept by crank arms 2 so that they can fit between said circles and the frame.

On the contrary, ahead of said circles, the width of said foot-rests can be substantially larger. For instance, as shown by Fig. 2, the foot-rests can be given a shape well adapted to their function. Thus the cyclist can at will either operate the pedals or lift his feet therefrom and place them on foot-rests 13. In this case, his position will be similar to that naturally assumed by a person seated on an ordinary seat.

Owing to the construction according to my invention, the cyclist is no longer compelled to keep his feet on the pedals, but he can place them in a more comfortable position, where they are better protected against water and mud from the ground.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

A cycle including a frame, a spindle journalled in said frame about a transverse axis, two crank levers fixed to said spindle at 180° to each other, a pedal at the end of each of said levers, a toothed disc fixed to said spindle coaxially therewith, a chain engaged on said disc, and two foot-rests one on each side of said frame, each constituted by an at least substantially horizontal plate rigidly fixed to said frame at a level above that of the top of said disc and below that of the top of the area swept by said pedals, said plates extending forwardly from a point within the lateral projection of the area swept by said pedals to a point substantially forwardly of said area, the portions of said plates within the lateral projection of the area swept by the pedals lying inside the paths of the crank levers and the portions in front of such area being wider than the rear portions and extending laterally outward in front of the paths of the crank levers.

References Cited in the file of this patent

UNITED STATES PATENTS

| 585,963 | Mercier | Nov. 16, 1897 |

FOREIGN PATENTS

| 8,000 | Great Britain | of 1913 |
| 20,246 | Great Britain | of 1911 |
| 807,488 | Germany | June 28, 1951 |